Patented June 25, 1929.

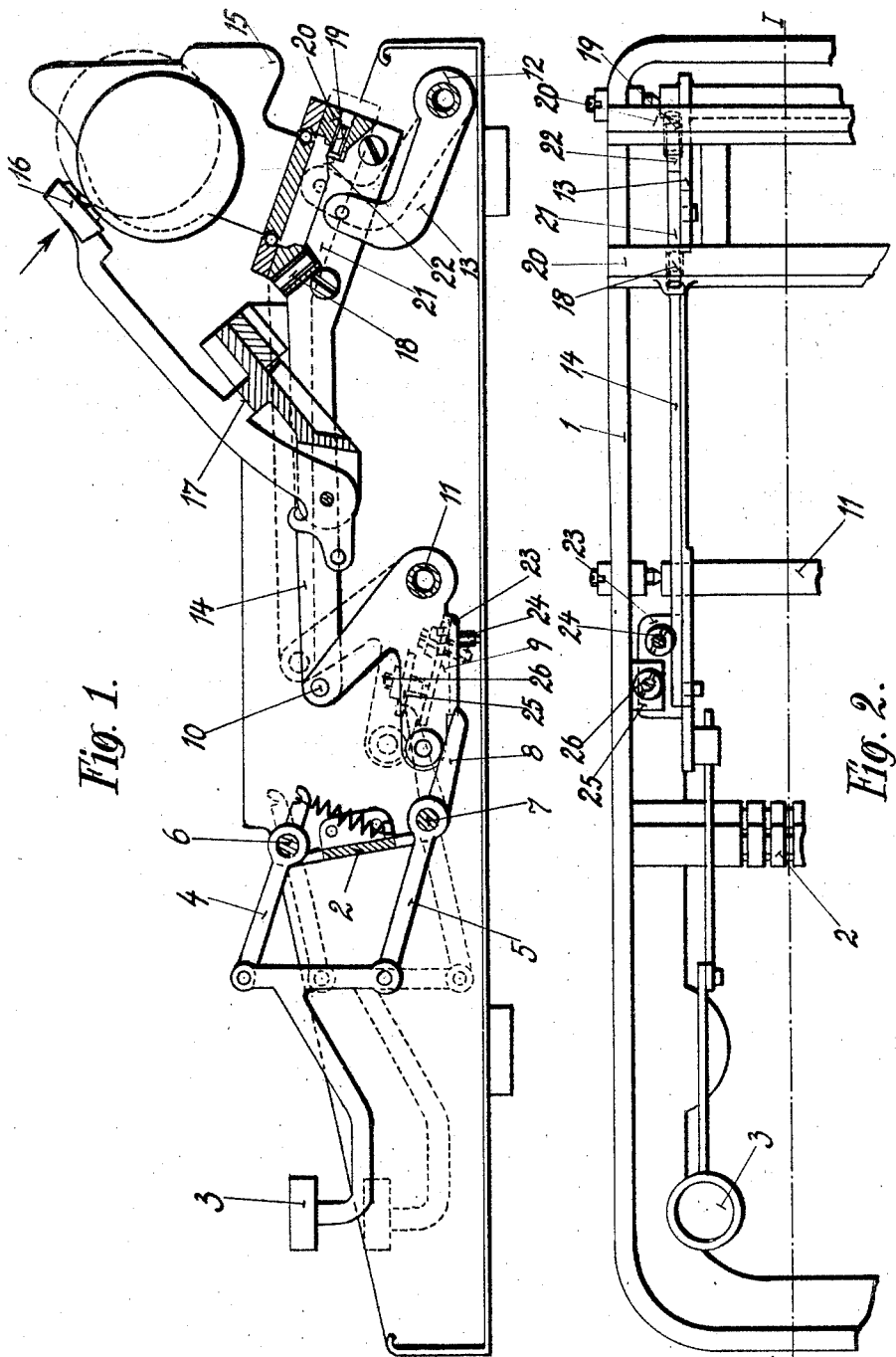

1,718,788

UNITED STATES PATENT OFFICE.

PAUL KÄPPLER, OF DRESDEN, GERMANY.

CASE-SHIFT MECHANISM.

Application filed November 4, 1927, Serial No. 231,009, and in Germany January 24, 1927.

This invention relates to case-shift mechanism for typewriters of the kind in which the type bars each carry a plurality of characters in conjunction with a movable carriage for the roller platen. The object of the invention is to provide simple means whereby the case-shift operation is accurately performed and can be readily justified. The invention has particular importance for low-built typewriters in which the case shift is effected by movement of the carriage, and in which the underframe of the carriage moves with the carriage and has attached thereto the letter-spacing and other mechanism.

In such machines, it is known to effect parallel movement of the paper carriage by means of a pair of links, but such known arrangements have the drawback that the pivots of the links are relatively close together and are both situated a long way back, resulting in unreliable control and the justifying screws or studs for the case-shift movement are difficult of access.

In certain other machines, the front links turn in the opposite direction to the rear links, so that a true parallel movement of the carriage does not take place during the case-shifting operation. Moreover, it requires a number of actuating levers to operate it. In this case also the forces act in different planes and if the shift keys are not depressed at even pressure, the machine may easily twist and result in bad typewriting.

In such machines, the back-spacing mechanism gives rise to particular difficulty, firstly owing to the disturbing action of the case-shift movement on the back-spacing mechanism, and secondly the necessity of preventing the forces set up during the back-spacing movement from having any effect on the case-shifting movement.

According to the present invention, the aforementioned requirements are fulfilled by the relative position of the pivots, by the manner of actuation and by the arrangement of the stops or limiting screws. The pairs of links which support the carriage rotate in the same direction during the case-shifting movement and have their pivots far apart. The front link is directly driven by one arm of links which ensure parallel movement of the shift key.

In order to prevent any twisting and consequent irregularity in alignment by different pressure on the shift keys and in order to avoid the provision of a special stop for the shift keys, the stops for limiting the carriage movement are fitted, according to this invention, on the same arm of the link driven to effect the case-shift as that which receives the actual driving power. The position of this link also renders the stops very accessible.

Furthermore, the motion of the back-space key is transmitted to a lever mounted on one of the side bars supporting the carriage in a direction which approximately corresponds to the position of the carriage links, which is always determined by the radius drawn from one link pivot to the joint or connection with the side bar, so that the back-spacing movement has no disturbing effect.

The back-spacing key is furthermore kept substantially parallel by links, one of which is so arranged that a rod connecting it to the transmission lever lies in the direction of the carriage link.

The invention is hereinafter described with reference to the accompanying drawings illustrating one example of carrying out the invention.

Fig. 1 is a cross-sectional view through the machine on the line 1—1 of Fig. 2 and Fig. 2 is a fragmentary plan view omitting the type bars and key levers with the exception of the shift key.

Figure 3:
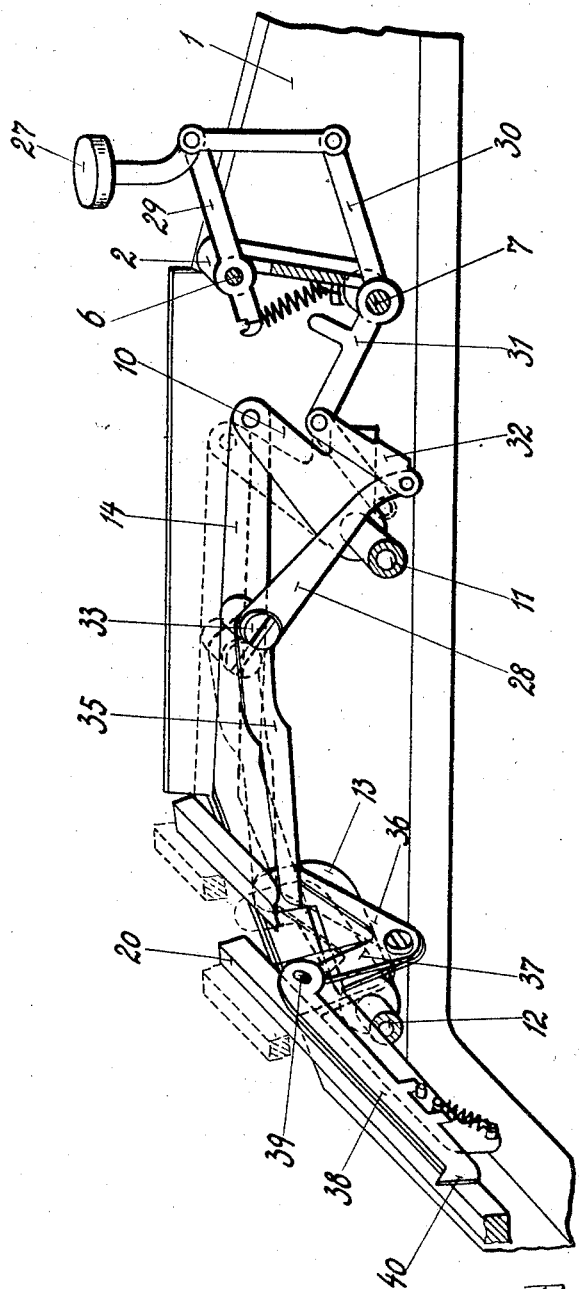
Fig. 3 is a perspective view of the back-spacing arrangement omitting the movable parts of the carriage.

Across the machine frame 1 extends a bearing bracket 2 formed with slots in which the character key levers and shift key levers are mounted in known manner. In the construction illustrated, the shift keys 3, as also the character keys not illustrated, are ensured a substantially parallel movement by links 4 and 5 which are mounted on pivot pins 6 and 7 respectively. An arm 8 on the lower link 5 transmits the motion of the shift key 3 directly to the carriage shift link, which is constructed in the form of a bell-crank lever 9, 10 whose pivot 11 is mounted in suitable journals well forward in the machine frame. At about the same height as the pivot 11 is the pivot 12 of the rear carriage shift link 13.

The two links 10 and 13 are connected by the side bar 14 on which the carriage with roller platen 15 is adjustably secured. The type 16 strike the roller platen in the direction of the arrow. Both links 10 and 13 swing through an arc which is bisected by a line parallel to the direction of stroke of the type at the printing point, so that the straight line between the upper and lower positions of the joint between the link and side bar is exactly at right angles to the direction of stroke of the type.

The correct limitation and justifying of the carriage shift lever in the normal position as well as in the shifted position, and the transmission of power for the case-shifting movement is effected through the arm 9 of the front shift link. In the normal position, a screw 24 screwed into the bent plate 23 of the arm 9 abuts against the edge of the machine frame 1, whilst in the shifted position indicated in dotted lines, a screw 26 threaded into a bracket 25 on the machine frame 1 strikes against the bent plate 23 of the arm 9. The two screws 24 and 26 and their locknuts are readily accessible, so that the assembly and justifying is considerably facilitated.

If a shift key is only provided at one side of the machine, it is only necessary to provide stops on the same side. It is however possible to manage with stops on one side only even with a machine having shift keys at both sides. In such case, in order to obviate forcible twisting of the whole carriage shift movement in the event of the shift key being struck too hard on the side not fitted with stops, the arm 10 on this side of the machine should be omitted and the side bar 14 correspondingly shortened, so that it is only controlled on this side by the link 13.

At one side of the roller platen a bell-crank lever 28 is mounted at 33 on the side bar 14 and is actuated by the back-space key 27, which is ensured a parallel movement like the shift keys by means of parallel links 29 and 30. The lower link 30 acts through its arm 31 and link 32 upon the lever 28, the mean force acting in the direction of the arrow, which coincides with the direction of stroke of the type and thus with the middle position of the shift links 10 and 13, so that the force exerted on the back-space key 27 has no appreciable influence on the case-shifting movement and the back-spacing acts independently of the case-shifting movement.

The other arm 35 of the lever 28 acts upon a bell-crank 36, 37 which is connected to the back-space bar 38. The pin 39 of the bell-crank cooperates in known manner with an inclined slot in the back-space bar 38, whereby the dog 40 of the back-space bar is first brought into engagement with the teeth of the carriage rack bar, escapement wheel or driving wheel and then effects the backward movement of the carriage. The backward movement is limited and justified by the provision of suitable stops.

Having now particularly described and ascertained the nature of my said invention and in what manner the same is to be performed, I declare that what I claim is:—

1. In a case shift mechanism for typewriters, a frame, a shiftable carriage, front and rear carriage shifting link members fulcrumed on the frame for movement in the same direction and coupled to the carriage and having their fulcrums arranged substantially in the same horizontal plane, a shift key, and a pair of upper and lower parallel motion links coupled to the shift key and movable thereby, the lower link of said pair operating to transmit direct motion to the front carriage shifting link upon the actuation of said key.

2. In a case shift mechanism for typewriters, a frame, a shiftable carriage, a bar connected to the carriage, front and rear carriage shifting link members fulcrumed on the frame and coupled to said bar and having their fulcrums arranged substantially in the same horizontal plane, a shift key, and a pair of upper and lower parallel motion links coupled to the shift key and movable thereby, the lower link of said pair operating to transmit direct motion to the front carriage shifting link upon the actuation of said key.

3. In a case shift mechanism for typewriters, a frame, a shiftable carriage, a rear carriage shifting link member, a front carriage shifting link member of bell-crank form, said link members being fulcrumed on the frame substantially in the same horizontal plane and the rear link member and one arm of the front link member being coupled to each other and to the carriage for carriage shifting motion in the same direction, a shift key, and a pair of upper and lower parallel motion links connected to the key and movable thereby, the lower link of said pair operating to engage and transmit direct motion to the other arm of the bell-crank carriage shifting link upon the actuation of said key.

4. In a case shift mechanism for typewriters, a frame, a shiftable carriage, front and rear carriage shifting link members fulcrumed on the frame for movement in the same direction and coupled to the carriage and having their fulcrums arranged substantially in the same horizontal plane, a shift key, and a pair of upper and lower parallel motion links coupled to the shift key and movable thereby, the lower link of said pair having an arm engageable with and adapted to transmit direct motion to the front carriage shifting link upon the actuation of said key.

5. In a case shift mechanism for typewriters, a frame, a shiftable carriage, a rear carriage shifting link member, a front carriage shifting link member of bell-crank form, said link members being fulcrumed on the frame substantially in the same horizontal plane and the rear link member and one arm of the front link member being coupled to each other and to the carriage for carriage shifting motion in the same direction, a shift key, and a pair of upper and lower parallel motion links connected to the key and movable thereby, the lower link of said pair having an arm engageable with the other arm of the bell-crank carriage shifting link for transmitting direct motion thereto upon the actuation of said key.

6. In a case shift mechanism for typewriters, a frame, a shiftable carriage, a substantially horizontal bar connected to the carriage, front and rear carriage shifting link members fulcrumed on the frame and coupled to said bar and having their fulcrums arranged substantially in the same horizontal plane, a shift key, and a pair of parallel motion links coupled to the shift key and movable thereby, the lower link of said pair having an arm engageable with and adapted to transmit direct motion to the front carriage shifting link upon the actuation of said key.

7. In a case shift mechanism for typewriters, a frame, a shiftable carriage, front and rear carriage shifting link members fulcrumed on the frame for movement in the same direction and coupled to the carriage and having their fulcrums arranged substantially in the same horizontal plane, a shift key, coacting stop members on the frame and front carriage shifting link engageable respectively with the link and with the frame for limiting the movements of said link, and a pair of upper and lower parallel motion links coupled to the shift key and movable thereby, the lower link of said pair operating to transmit direct motion to the front carriage shifting link upon the actuation of said key.

8. In a case shift mechanism for typewriters, a frame, a shiftable carriage, a bar connected to the carriage, front and rear carriage shifting link members fulcrumed on the frame and coupled to said bar and having their fulcrums arranged substantially in the same horizontal plane, a shift key, coacting stop members on the frame and front carriage shifting link engageable respectively with the link and with the frame for limiting the movements of said link, and a pair of upper and lower parallel motion links coupled to the shift key and movable thereby, the lower link of said pair operating to transmit direct motion to the front carriage shifting link upon the actuation of said key.

9. In a case shift mechanism for typewriters, a frame, a shiftable carriage, a rear carriage shifting link member, a front carriage shifting link member of bell-crank form, said link members being fulcrumed on the frame substantially in the same horizontal plane and the rear link member and one arm of the front link member being coupled to each other and to the carriage for carriage shifting motion in the same direction, a shift key, coacting stop members on the frame and front carriage shifting link engageable respectively with the link and with the frame for limiting the movements of said link, and a pair of upper and lower parallel motion links connected to the key and movable thereby, the lower link of said pair operating to engage and transmit direct motion to the other arm of the bell-crank carriage shifting link upon the actuation of said key.

10. In a case shift mechanism for typewriters, a frame, a shiftable carriage, front and rear carriage shifting link members fulcrumed on the frame for movement in the same direction and coupled to the carriage and having their fulcrums arranged substantially in the same horizontal plane, a shift key, coacting stop members on the frame and front carriage shifting link engageable respectively with the link and with the frame for limiting the movements of said link, and a pair of upper and lower parallel motion links coupled to the shift key and movable thereby, the lower link of said pair having an arm engageable with and adapted to transmit direct motion to the front carriage shifting link upon the actuation of said key.

11. In a case shift mechanism for typewriters, a frame, a shiftable carriage, a rear carriage shifting link member, a front carriage shifting link member of bell-crank form, said link members being fulcrumed on the frame substantially in the same horizontal plane and the rear link member and one arm of the front link member being coupled to each other and to the carriage for carriage shifting motion in the same direction, a shift key, coacting stop members on the frame and front carriage shifting link engageable respectively with the link and with the frame for limiting the movements of said link, and a pair of upper and lower parallel motion links connected to the key and movable thereby, the lower link of said pair having an arm engageable with the other arm of the bell-crank carriage shifting link for transmitting direct motion thereto upon the actuation of said key.

12. In a case shift mechanism for typewriters, a frame, a shiftable carriage, a substantially horizontal bar connected to the carriage, front and rear carriage shifting link members fulcrumed on the frame and coupled to said bar and having their fulcrums arranged substantially in the same horizontal plane, a shift key, coacting stop members on the frame and front carriage shifting link engageable respectively with the link and with the frame for limiting the movements of said link, and a pair of parallel motion links coupled to the shift key and movable thereby, the lower link of said pair having an arm engageable with and adapted to transmit direct motion to the front carriage shifting link upon the actuation of said key.

13. In a carriage shift and back spacing mechanism for typewriters, a frame, a carriage, a bar connected to the carriage, front and rear carriage shifting links coupled to said bar for movements in the same direction in unison, a shift key, a pair of upper and lower parallel motion links connected to said key and movable thereby, the lower one of said links being operative to engage and transmit motion to the front carriage shifting link, a back spacing device, a back spacing key, upper and lower parallel motion link members actuated by said key, and connecting means between the lower link member of said parallel motion link members including a lever fulcrumed on the bar for actuating said back spacing device upon the depression of the key.

14. In a carriage shift and back spacing mechanism for typewriters, a frame, a carriage, a bar connected to the carriage, front and rear carriage shifting links coupled to said bar for movements in the same direction in unison, a shift key, a pair of upper and lower parallel motion links connected to said key and movable thereby, the lower one of said links being operative to engage and transmit motion to the front carriage shifting link, a back spacing device, a back spacing key, upper and lower parallel motion link members actuated by said key, a bell-crank lever coupled to the back spacing device, a bell-crank lever on the bar for operating the aforesaid lever, and connecting means between the second-named bell-crank lever and the lower link member of said parallel motion link members.

PAUL KÄPPLER.